United States Patent [19]
Sorensen

[11] Patent Number: 5,351,488
[45] Date of Patent: Oct. 4, 1994

[54] SOLAR ENERGY GENERATOR

[76] Inventor: Wilfred B. Sorensen, 121 Counter Street, Box 1, Kingston, Ontario, Canada K7K 6C7

[21] Appl. No.: 188,844

[22] Filed: Jan. 31, 1994

[51] Int. Cl.5 .............................. F24J 3/02; F03G 7/02
[52] U.S. Cl. ..................... 60/641.11; 417/207; 417/208; 165/104.22; 165/104.29; 126/635; 126/639
[58] Field of Search ............... 417/207, 208; 165/104.22, 104.29, 104.24; 126/638, 639, 635; 60/641.11

[56] References Cited

U.S. PATENT DOCUMENTS

| | | | |
|---|---|---|---|
| 4,270,521 | 6/1981 | Brebbe | 165/104.22 |
| 4,341,202 | 7/1982 | French | 165/104.22 |
| 4,391,100 | 7/1983 | Smith | 60/641.11 |
| 4,478,211 | 10/1984 | Haines et al. | 126/639 |
| 4,528,976 | 7/1985 | Baer | 126/639 |
| 4,552,208 | 11/1985 | Sorensen | 165/104.22 |
| 4,607,688 | 8/1986 | Sorensen | 165/104.22 |

Primary Examiner—Albert W. Davis, Jr.
Attorney, Agent, or Firm—Richard J. Hicks

[57] ABSTRACT

A system for coupling a plurality of solar powered bubble pumps in series is described. By controlling the boiling temperature of the circulating fluid contained in the system, the flow of liquid between the units of the series can be balanced and the pressure differential between the first and last units can be used to convert heat energy into kinetic energy by use of an external turbine or electrical generator.

7 Claims, 2 Drawing Sheets

SOLAR ENERGY GENERATOR

FIELD OF INVENTION

This invention relates to the generation of electrical power from a heat source such as solar energy. More particularly this invention relates to a plurality of solar bubble pumps connected in series so as to produce a pressure gradient therebetween, which can be used to drive a turbine, absorption type air chiller, or the like.

BACKGROUND OF THE INVENTION

Solar bubble pumps have been described in U.S. Pat. Nos. 4,552,208 issued Nov. 12, 1985 and 4,607,688 issued Aug. 26, 1986 to Sorensen. Using the bubble pump principle hot liquid can be transferred from one elevation to a lower elevation without the need for an externally powered pump. Another design is described in Haines et al U.S. Pat. No. 4,478,211 which shows a system in which hot liquid is tranferred from a higher level to a lower level and in which the vapour from the bubbles is injected into the gas space above the liquid in the riser tubes. Heretofore, however, bubble pumps have not been used in series to amplify the pressure gradient therebetween in such a way that useful kinetic energy can be derived therefrom. It is believed that heretofore it has not been possible to control the boiling temperature in the bubble pump so that balance between a series of bubble pumps could be achieved. Unless the pumps are balanced, some will become flooded and some will become underfilled resulting in a decreased pressure differential across the system.

OBJECT OF THE INVENTION

It is, therefore, an object of the present invention to provide a method for controlling the boiling temperature in each of a plurality of bubble pumps connected in series, so as to provide a balanced system which can be used to convert thermal energy into kinetic and/or electrical energy.

Another object of this invention is to provide a self contained system for generating mechanical or electrical energy from a heat source such as a solar source, which does not require conventional pumps to circulate the working fluid.

BRIEF STATEMENT OF THE INVENTION

Thus by one aspect of this invention there is provided a bubble pump comprising:
(a) a sealed separator chamber;
(b) a sealed condenser chamber;
(c) conduit means defining a fluid flow path between said condenser chamber and said separator chamber;
(d) heat energy collector means in said fluid flow path between said condenser chamber and said separator chamber, arranged to partially vaporize a fluid circulating between said condenser and said separator.
(e) conduit means between said separator chamber and said condenser chamber arranged to deliver vapour separated in said separation chamber to cooled said circulating fluid in said condenser chamber;
(f) conduit means arranged to provide a fluid flow path for liquid separated from said vapour in said separator chamber to an external energy transfer means;
(g) conduit means arranged to provide a fluid flow path for cooled liquid from said external energy transfer means to said condenser chamber; and
(h) means to control the level of liquid in said condenser means to thereby control the temperature of vaporization of said fluid circulating between said condenser chamber and said separator chamber.

By another aspect of this invention there is provided a system for generating kinetic energy from heat energy comprising a plurality of bubble pumps as described above, arranged in series so as to generate a pressure differential between said cooled liquid flowing into said condenser means of the first bubble pump in said series and hot liquid flowing from said separator chamber of the last bubble pump in said series to thereby provide kinetic energy to said external energy transfer means.

DETAILED DESCRIPTION OF PREFERRED EMBODIMENT

Figure 1:
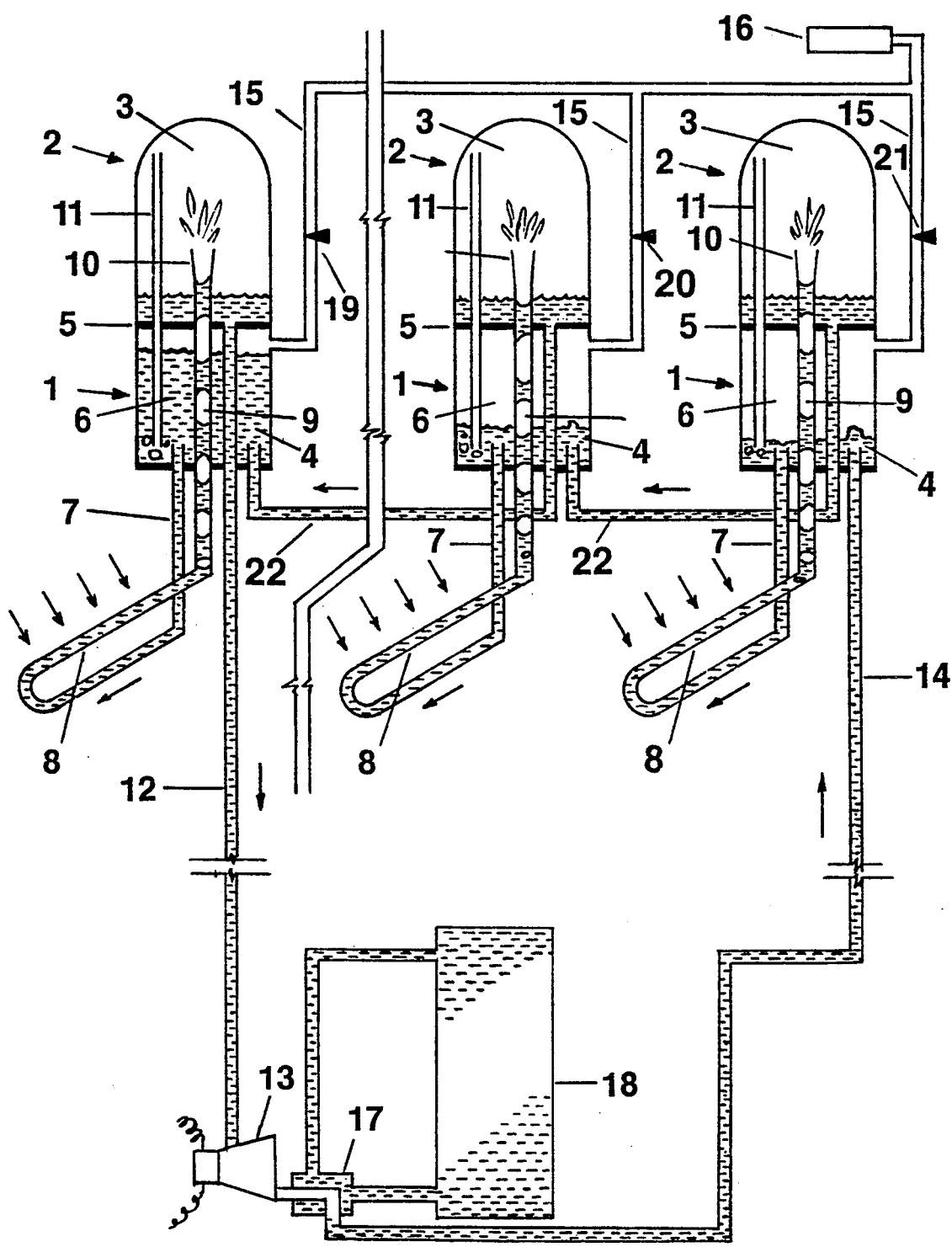
FIG. 1 is a schematic diagram showing a plurality of bubble pumps in series connected to a turbine generator for producing electrical power.

Turning firstly to the construction of a bubble pump for use in the system shown in FIG. 1, reference will be made to the bubble pump shown in FIG. 2. The bubble pump 1 comprises, preferably but not essentially, a dome shaped container 2, preferably but not essentially, made of glass or transparent plastics material for ease of viewing the operation therein. Container 2 is divided into two separate chambers 3, and 6 by an impervious divider 5. Chamber 3 is defined as the separator and chamber 6 is defined as the condenser. Cold condensate working fluid 4 from condenser chamber 6 passes through a conduit 7 to the bottom of a solar array 8 where it is heated by solar energy. The working fluid 4 may be water, or where there is a risk of freezing, a mixture of ethylene glycol and water or another fluid having a suitable boiling point and vapour pressure. Solar energy causes the liquid 4 to boil and form a gas/liquid mixture containing a large number of vapour bubbles 9 which rise up tube 10 and splash out of the top thereof, in the manner of a coffee percolator. The vapour rises into dome 2 and passes into tube 11 which carries the vapour to the condenser chamber 6 where it condenses in cold working fluid 4. The hot working liquid thus separated from the vapour falls to the bottom of the separator chamber 3 from whence it passes via tube 12 to a heat exchanger (not shown), as described in more detail hereinafter, or to the external turbine 13 from which the liquid returns to the condenser chamber of the downstream bubble pump via conduit 14. The pressure in the condenser chamber 6 is controlled by air purge tube 15 and a hand operated vacuum pump 16, in conjunction with valve 19, so as to balance the flow of working fluid in the system and prevent flooding of the separator or condenser chamber.

Figure 2:
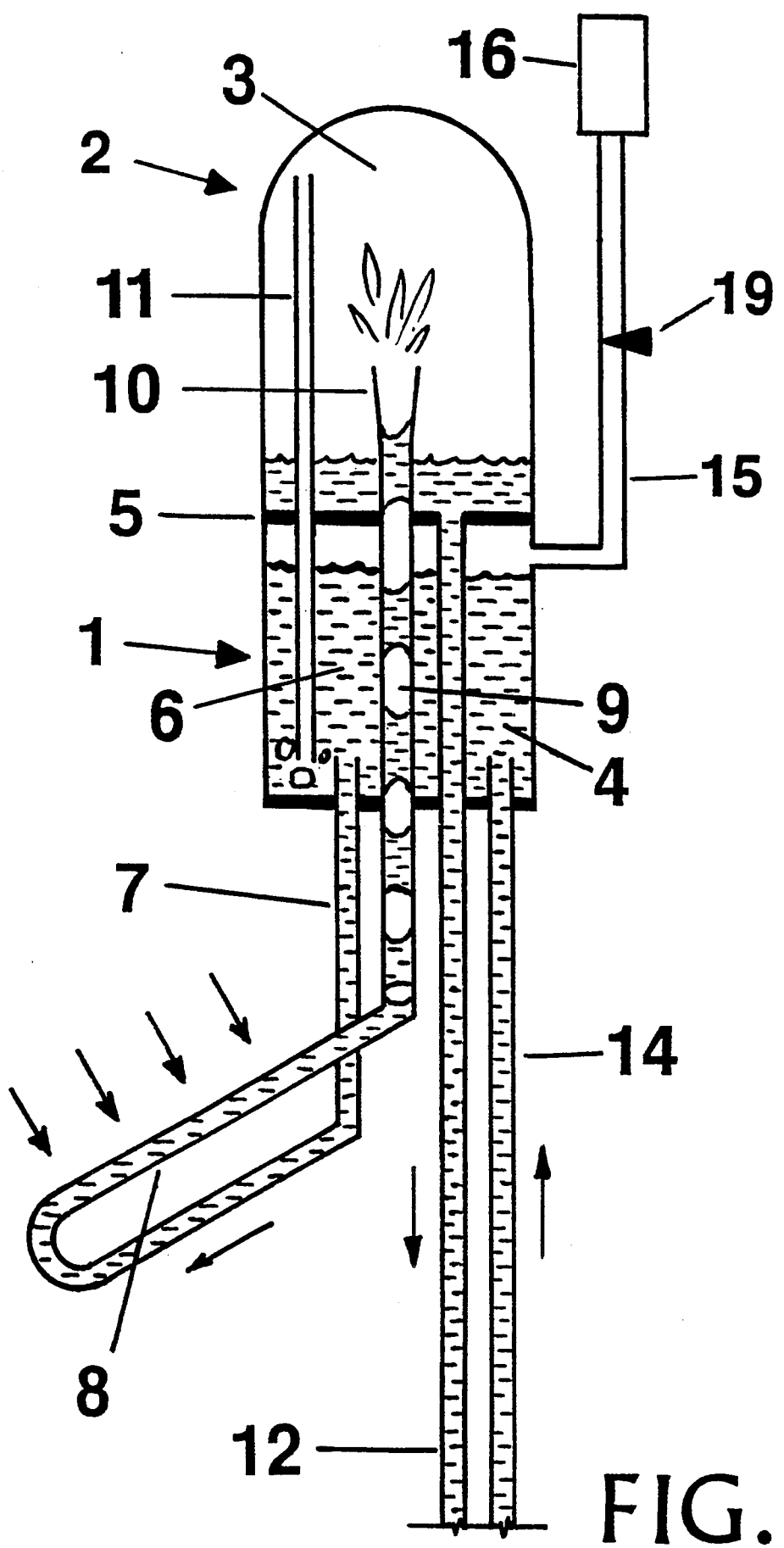
FIG. 2 is a schematic diagram of another embodiment of a bubble pump for use in the system of FIG. 1.

Turning now to the system shown in FIG. 1, which shows three bubble pumps 1 connected in series via conduits 22, it will be appreciated that the number of pumps is a matter of design choice and up to about twenty pumps in series are contemplated in order to produce sufficient pressure to drive low-head turbine 13. It will be noted that each unit 1 is expected to provide a pressure differential of about 8 inches of water between the input and output sides. This differential is, of course, cumulative between all units in the series. It will be appreciated that the pressure in the system can be regulated by (a) regulating the level at which the vapour in respective conduits 11 is injected into the cool liquid in respective condensers 6 and (b) regulating the height of the column of cooler liquid in respective condensers 6. Thus the pressure of the vapour entering the condenser chamber 6 can be controlled and thus the boiling temperature of the liquid can be controlled under the standard gas laws. The ability to control the boiling temperature of a bubble pump makes it possible to balance any number of bubble pumps connected in series and avoid problems of flooding or underfilling of individual cells.

It will be further noted that no condensate return pump is required from the condenser 17 downstream of the turbine 13 to the condenser chamber 6 of the first bubble pump 1 in the cascade or series thereof. Optionally, condenser 17 may be coupled in a heat exchange relationship with a water heating device 18 to provide domestic hot water.

I claim:

1. A bubble pump comprising:
   (a) a sealed separator chamber;
   (b) a sealed condenser chamber;
   (c) conduit means defining a fluid flow path between said condenser chamber and said separator chamber;
   (d) solar energy collector means in said fluid flow path between said condenser chamber and said separator chamber, arranged to partially vapourize a fluid circulating between said condenser chamber and said separator chamber;
   (e) conduit means between said separator chamber and said condenser chamber arranged to deliver vapour separated in said separator chamber into a cooled fluid circulating in said condenser chamber;
   (f) conduit means arranged to provide a fluid flow path for liquid separated from said vapour in said separator chamber to an external energy transfer means;
   (g) conduit means arranged to provide a fluid flow path for cooled fluid from said external energy transfer means to a condenser; and
   (h) means to control the level of liquid in the condenser to thereby control the temperature of vapourization of said fluid circulating between said condenser chamber and said separator chamber.

2. A bubble pump as claimed in claim 1 wherein said means to control the level of a liquid in said condenser means comprises an air purge tube operatively coupled to a vacuum pump.

3. A bubble pump as claimed in claim 1 wherein said external energy transfer means comprises a low head turbine means.

4. A bubble pump as claimed in claim 1 wherein said separator chamber is arranged at a level vertically above said condenser chamber.

5. A system for generating kinetic energy from heat energy comprising a plurality of bubble pumps as claimed in claim 1, arranged in series so as to generate a pressure differential between said cooled liquid flowing into said condenser means of the first bubble pump in said series and hot liquid flowing from said separator chamber of the last bubble pump in said series to thereby provide kinetic energy to said external energy transfer means.

6. A system as claimed in claim 5 wherein said external energy transfer means comprises a low head turbine means.

7. A system as claimed in claim 6 wherein said turbine means includes heat exchange means to recover waste heat from said circulating fluid.

* * * * *